Aug. 27, 1935.  G. A. MITCHELL  2,012,515
VIEW FINDER PARALLAX AND PHOTOGRAPHIC LENS FOCUSING
MECHANISM FOR MOTION PICTURE CAMERAS
Filed March 16, 1934    4 Sheets-Sheet 1
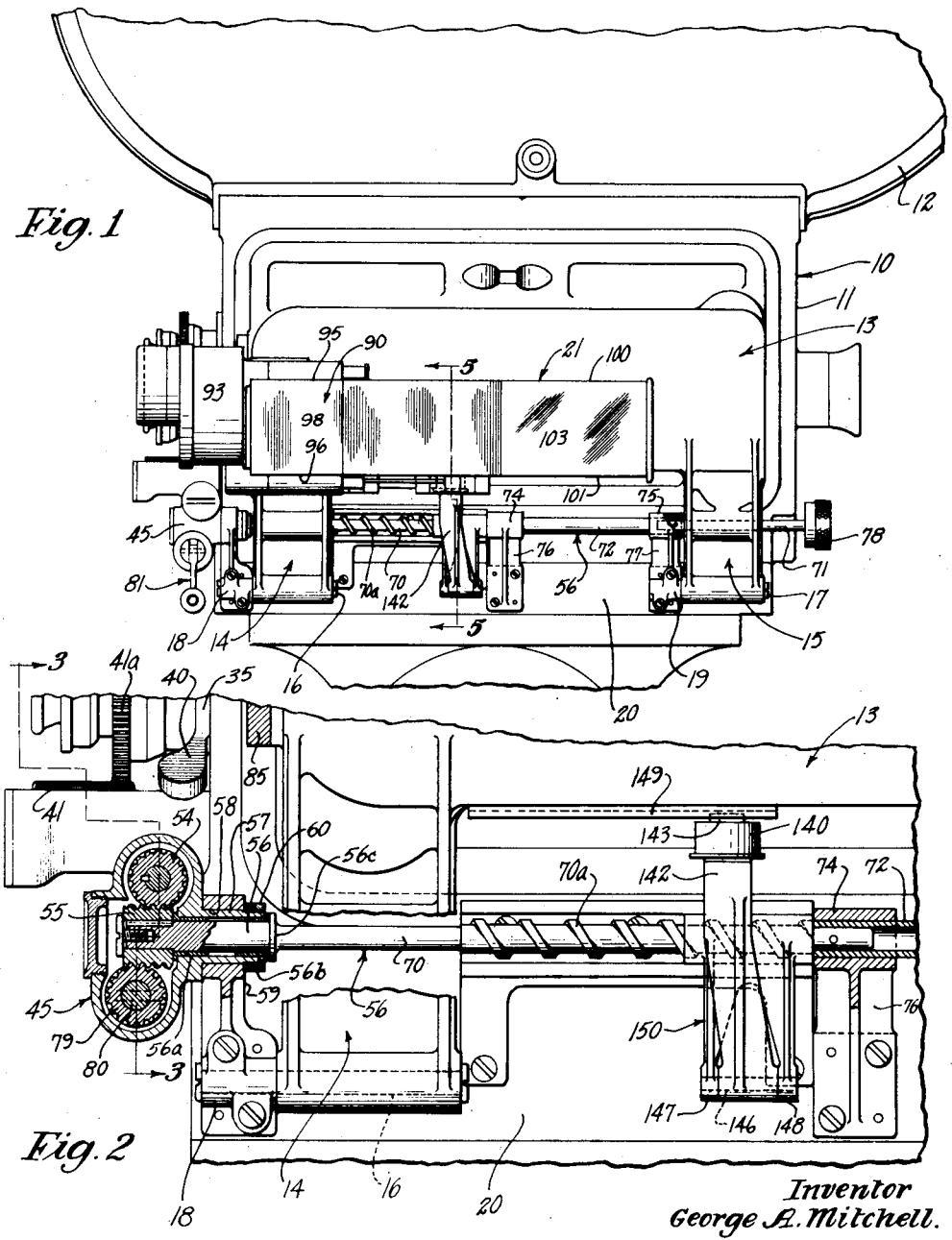
Inventor
George A. Mitchell.
Attorney.

Aug. 27, 1935.   G. A. MITCHELL   2,012,515
VIEW FINDER PARALLAX AND PHOTOGRAPHIC LENS FOCUSING
MECHANISM FOR MOTION PICTURE CAMERAS
Filed March 16, 1934    4 Sheets-Sheet 2

Inventor
George A. Mitchell
Attorney.

Aug. 27, 1935.                   G. A. MITCHELL                      2,012,515
     VIEW FINDER PARALLAX AND PHOTOGRAPHIC LENS FOCUSING
            MECHANISM FOR MOTION PICTURE CAMERAS
                   Filed March 16, 1934              4 Sheets-Sheet 3
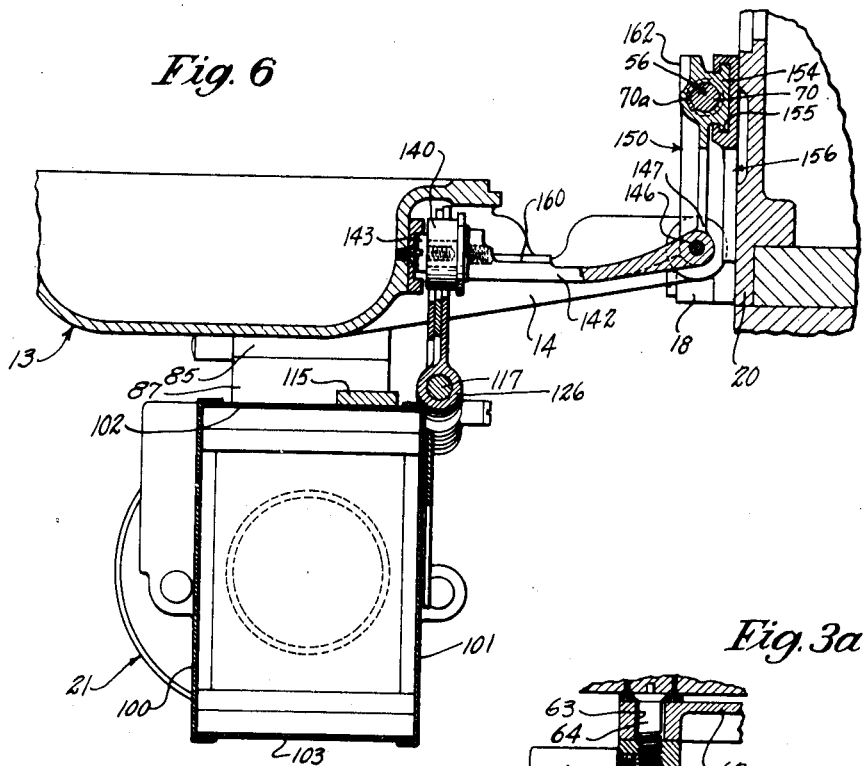
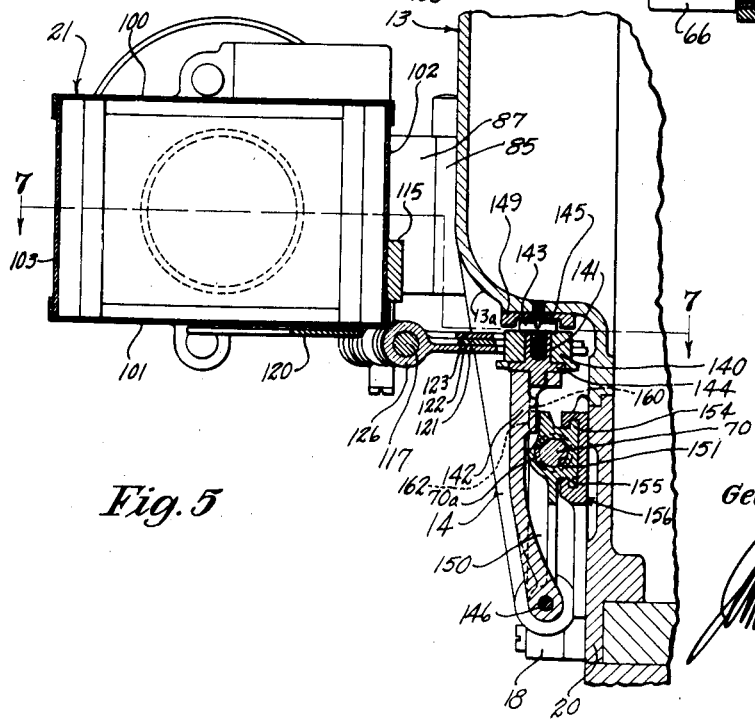
Inventor
George A. Mitchell.
Attorney.

Aug. 27, 1935.  G. A. MITCHELL  2,012,515
VIEW FINDER PARALLAX AND PHOTOGRAPHIC LENS FOCUSING
MECHANISM FOR MOTION PICTURE CAMERAS
Filed March 16, 1934  4 Sheets-Sheet 4
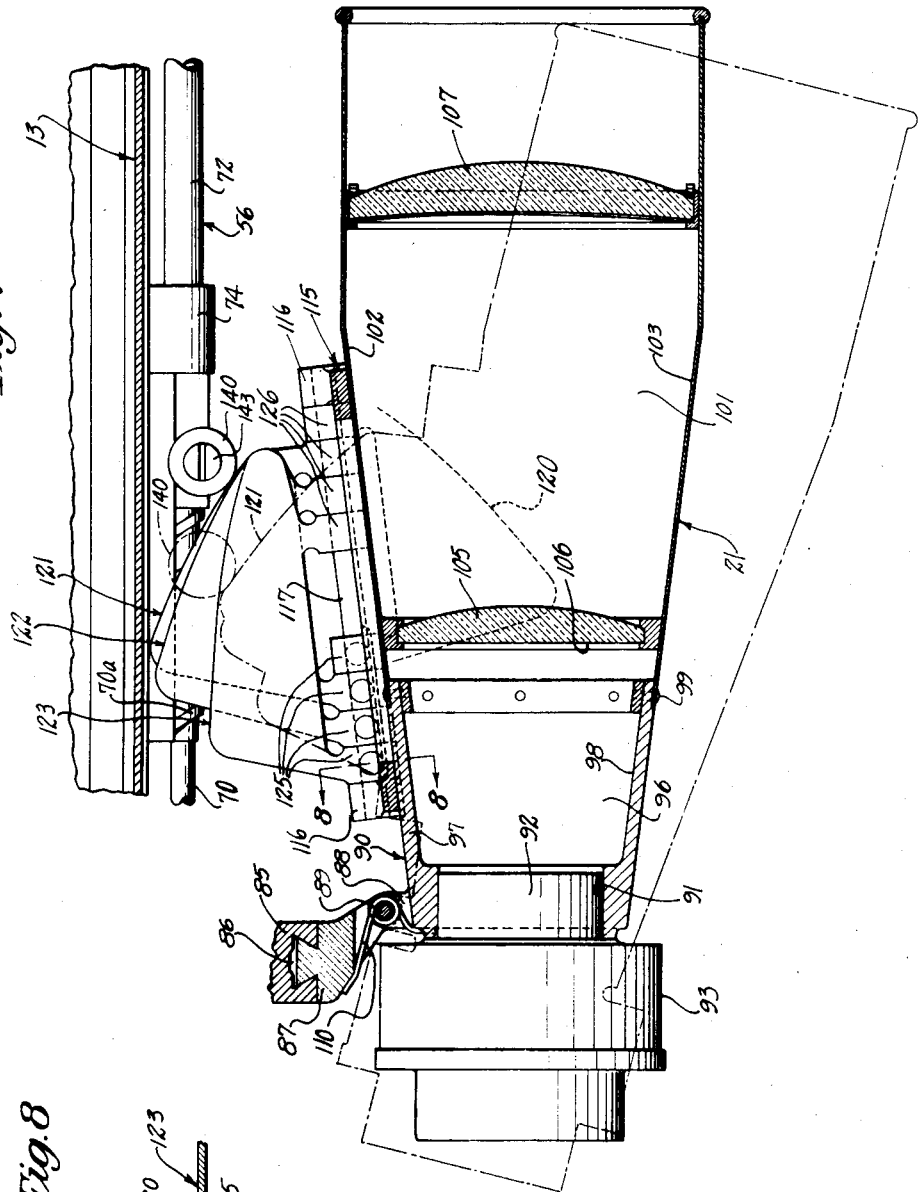
Inventor
George A. Mitchell.
Attorney.

Patented Aug. 27, 1935

2,012,515

UNITED STATES PATENT OFFICE 2,012,515

VIEW FINDER PARALLAX AND PHOTOGRAPHIC LENS FOCUSING MECHANISM FOR MOTION PICTURE CAMERAS

George A. Mitchell, Los Angeles, Calif., assignor to Mitchell Camera Corporation, West Hollywood, Calif., a corporation of Delaware Application March 16, 1934, Serial No. 715,838

17 Claims. (Cl. 95—44)

This invention relates generally to focusing and view finding devices for motion picture cameras.

Motion picture cameras are commonly equipped with view finding instruments, which are mounted on the camera body to one side of the optical axis of the photographic lens. The view finder is mounted on the camera through a vertical pivot, which enables it to be swung in a horizontal direction to adjust for parallax, as is well understood. Motion picture cameras have in the past been equipped with means for so swinging the view finder, actuated by the focusing means for the photographic lens of the camera. The difficulty involved in devising such a mechanism arises from the fact that motion picture cameras usually employ interchangeable lenses which are of different focal lengths, and hence require different ranges of focusing movement, which means that the lens focusing mechanism has a different range of operation for each lens, while the swinging movement which must be given to the finder as the camera lens is focused (and which is to be derived from the varying operation of the lens focusing mechanism) must be the same for all lenses.

It may now be stated that an object of the present invention is to provide an improved camera focusing and automatic view finder parallax mechanism.
The mechanism provided by the present invention comprises a focusing mechanism for the camera lens, and a means for swinging the finder in accordance with the operation of the focusing mechanism involving a plurality of substitutive cams, each cam being selectively movable to operative position, and being designed for a camera lens of particular focal length, in such manner that when the lens corresponding to that cam is in photographing position in the camera, the operation of the focusing mechanism which is proper for focusing that lens is so modified through the cam as to cause proper parallax adjustment movement of the view finder.

Various additional objects and corresponding accomplishments of my invention will appear from the following detailed description of a present preferred embodiment of the invention, reference for this purpose being had to the accompanying drawings, in which:
Fig. 1 is a side elevation of a motion picture camera equipped with the present invention;

Fig. 2 is an enlarged detail taken from Fig. 1, certain parts being broken away;

Fig. 3a is a section on line 3a—3a of Fig. 3;

Fig. 5 is a section taken on line 5—5 of Fig. 1;

Fig. 6 is a view similar to that of Fig. 5, but with the side door and finder mounted thereon swung to a downward position;

Figure 3:
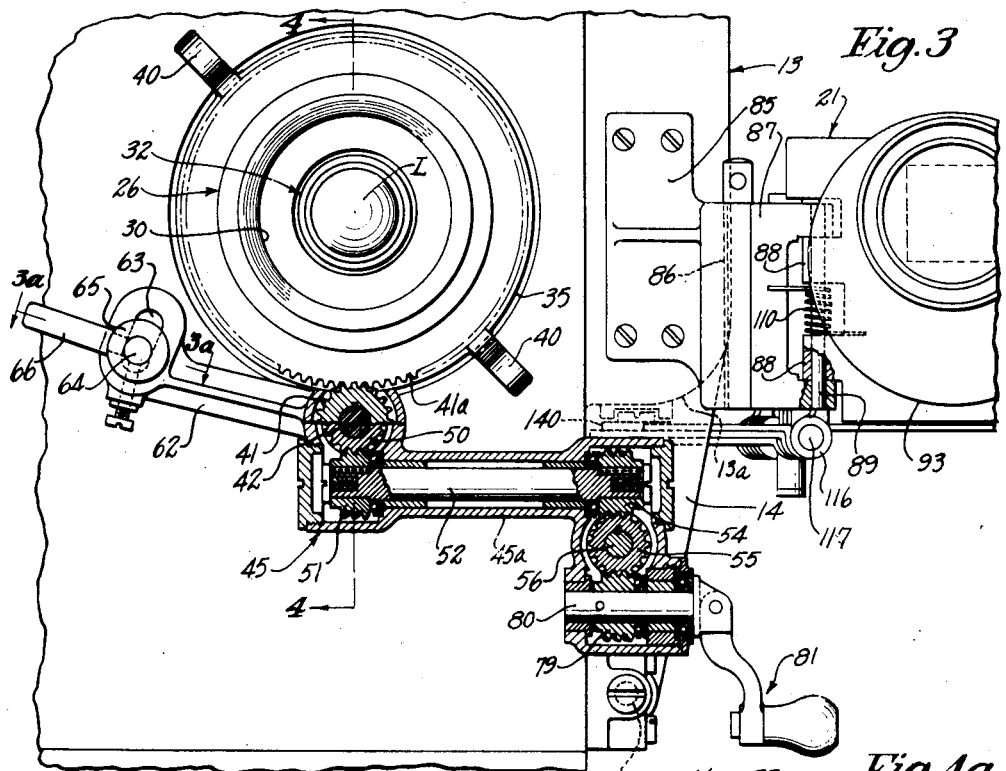
Fig. 3 is a section on the broken line 3—3 of Fig. 2.

Fig. 7 is a section taken on line 7—7 of Fig. 5; and
Fig. 8 is a detail section taken on line 8—8 of Fig. 7.

In the drawings numeral 10 designates generally a motion picture camera, comprising a camera box 11 which houses the usual film moving and guiding mechanism, shutter, etc., not necessary here to illustrate, and supports on its top a film magazine 12. The camera is equipped with a side door 13 through which access is gained to the camera interior, and this door is mounted on downwardly extending integrally formed arms 14 and 15, which are pivotally mounted at their lower ends on horizontal pivot pins 16 and 17 supported by mountings 18 and 19, respectively, affixed to the camera side wall 20. When it is desired to gain access to the interior of the camera, this door 13 is swung downwardly on pivots 16 and 17 to a position such as indicated in Fig. 6, carrying with it the view finder device 21 which is mounted thereon, as hereinafter more particularly described.

Figure 4:
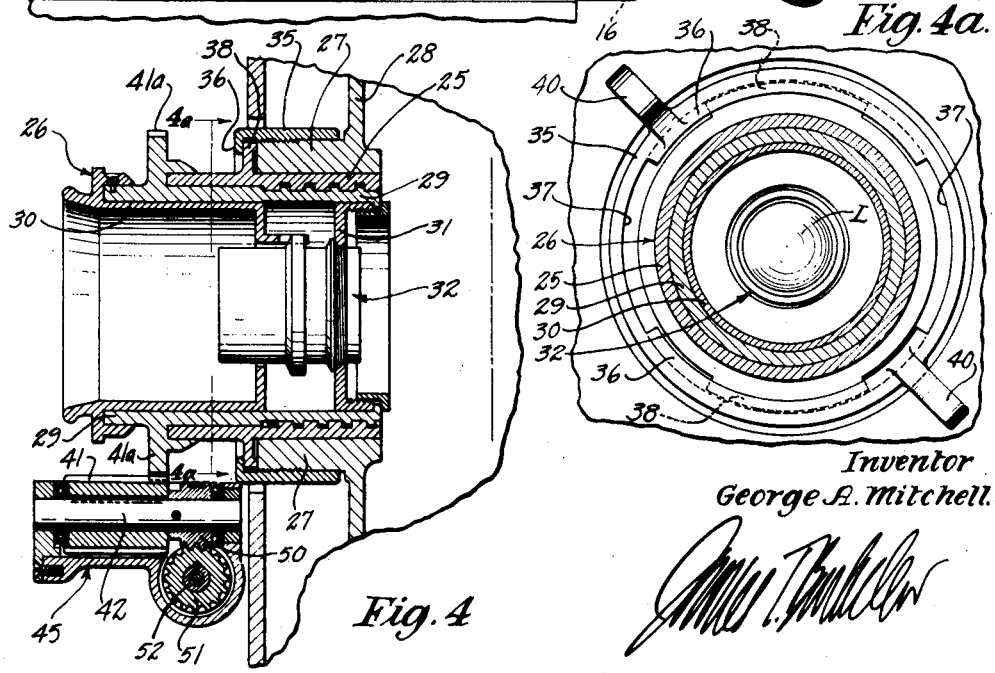
Fig. 4 is a section taken on line 4—4 of Fig. 3.
Figure 4A:
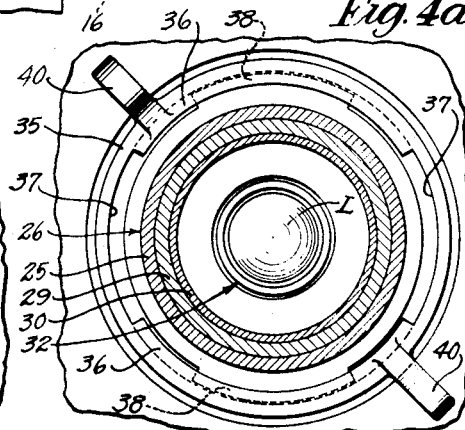
Fig. 4a is a section taken on line 4a—4a of Fig. 4.

The camera here shown is of the type having a single photographic lens mount holder, which is adapted to removably receive lens mounts having lenses of different focal lengths, rather than of the other common type involving a rotatable lens turret carrying a plurality of lenses of various focal lengths; it will be obvious from what follows, however, that the finder parallax device of the present invention is equally applicable to either type. As shown in Figs. 3, 4 and 4a, the cylindrical outer barrel 25 of lens mount 26 is removably received within a supporting sleeve 27 formed integrally with camera wall 28. Screw-threaded within barrel 25 is an inner barrel 29, while mounted within barrel 29 is a tube 30 and a ring 31 which carry and position the lens tube assembly 32 which contains the photographic lens L and the usual iris, not shown. Screw-threaded on supporting sleeve 27 is a clamping ring 35 which has at its forward end an inwardly turned flange 36, said flange having cut-out sections, as indicated at 37, for the reception of outwardly projecting lugs 38 on lens mount barrel 25. To insert the lens mount within supporting sleeve 27, it is rotated to register lugs 38 with the cut-out portions of flange 36 and then moved inwardly until lugs 38 engage the outer end of sleeve 27, as to the position shown in Fig. 4. A short turn of clamping ring 35, conveniently made by grasping hand lugs 40 formed thereon, causes the flange portion 36 of said ring to move over lugs 38 and to be clamped tightly thereagainst, thereby clamping the lens mount in position. The reverse procedure enables the lens mount quickly to be removed when it is desired to replace it with one having a lens of different focal length. Rotation of lens mount barrel 29 now causes said barrel and the photographic lens carried thereby to be screwed forwardly or rearwardly within outer barrel 25, and this operation is utilized to focus the lens.

For the purpose of so rotating lens mount barrel 29, said barrel is provided with an integrally formed spur gear 41a, which is adapted to mesh with a smaller spur gear 41 keyed on a shaft 42 which is journaled at its two ends in suitable bearings carried by a gear housing 45. Gear 41, the top of which projects out through an opening in housing 45, is of sufficient length that the gear 41a on the longitudinally travelling lens mount will remain in mesh therewith in all positions of such longitudinal travel, as will be clear from Fig. 4.

Pinned on shaft 42 immediately to the rear of gear 41 is a spiral gear 50 which meshes with a spiral gear 51 mounted on the end of a substantially horizontal shaft 52, which shaft 52 extends through and is mounted for rotation in a tubular section 45a of housing 45. This tubular housing portion extends substantially horizontally from below the lens mount to just beyond the side of the camera box, as indicated in Fig. 3. Mounted on the end of shaft 52, just outside the plane of the side of the camera box, is a spiral gear 54 which meshes with a spiral gear 55 mounted on the forward end of a horizontal longitudinally extending focusing shaft 56. The forward end of shaft 56 is journaled within bearings 56a and 56b carried by a concentric tubular extension 57 of housing 45, which extension is received within a bore 58 provided in the upper end of a supporting bracket 59 which extends upwardly from the mounting 18 affixed to the camera side wall. Nuts 60 screwthreaded on the end of housing extension 57, and set up adjacent bracket 59, secure housing 45 against separation from bracket 59. Shaft 56 is confined against longitudinal movement by means of a collar 56c which engages the outer end of bearing 56b, and by the engagement of the end of its spiral gear 55 with the end of bearing 56a.

It will be noted that the tubular extension 45a of housing 45 may be swung in an arc about the center of shaft 56, housing extension 57 rotating within concentric bracket bore 58, and gear 54 simply rolling on gear 55, whereby gear 41 may be moved into and out of mesh with lens mount gear 41a. Such movement of the housing is utilized to separate gears 41a and 41 when it is desired to change lens mounts in the camera. For the purpose of conveniently accomplishing this operation, the forward or swinging end of housing 45 is furnished with an arm 62 which has an arcuate slot 63 receiving a stud 64 which extends outwardly from the front wall of the camera (see Fig. 3a). On the outer end of stud 64 is screwthreaded a nut 65 provided with a manual thumb piece 66, which nut is set up against the hub of arm 62 to lock arm 62 and housing 45 in position with gears 40 and 41 in proper operative mesh, or is released when it is desired to lower arm 62 and housing 45 to carry said gears out of mesh.

Shaft 56 extends along the side of the camera, below the bulge 13a of side door 13, and between door arms 14 and 15 and the camera side wall, and is made up of front and rear sections 70 and 71, respectively, connected by a sleeve 72 within which the ends of section 70 and 71 are pinned. The shaft is supported by means of bearings 74 and 75 which rotatively support the two ends of sleeve 72, bearing 74 being mounted on a bracket 76 secured to the camera base, and bearing 75 being mounted on a bracket 77 formed integrally with the aforementioned shaft mounting 19.

On the rear end of shaft 56 is mounted a manual operating knob 78, by means of which said shaft may be rotated and the described gear train leading to the lens mount operated accordingly. Knob 78 is used when it is desired to focus the camera from a position at its rear. An additional operating means is preferably provided at the front of the camera for the purpose of focusing from that position. There is for this purpose provided in gear housing 45 a spiral gear 79 meshing with the lower side of the spiral gear 55 which is on the forward end of shaft 56, gear 79 being pinned on a shaft 80 which is mounted for rotation in housing 45, and which is provided at its outer end with a manual crank 81 by which it may be rotated. Crank 81 therefore affords a second means for rotating gear 55 and the balance of the gear train leading to the lens mount.

There has so far been described a focusing mechanism, operable either from the front or from the rear of the camera, for moving the lens mount forwardly or rearwardly to effect focusing. Suitable scales are of course provided for each lens mount to enable the focusing adjustments to be accurately made, such scales being well known and not being necessary here to illustrate. In accordance with the present invention, the automatic finder parallax device is associated with and operated by the described focusing mechanism.

The view finder carrying bracket 85 is mounted on camera door 13 (see Fig. 3), and removably interfitted therein, as by means of vertical dovetail way 86 (see Fig. 7) is a view finder mounting member 87. This mounting member 87 is in the form of a yoke and receives a pair of vertically spaced view finder lugs 88, a pivot pin 89 extending downwardly through the yoke arm and lugs 88. The view finder swings for its parallax adjustment on this pivot pin 89.

The lugs 88 through which finder is pivotally mounted to swing on pin 89 are formed on one side of finder head casting 90 (see Fig. 7). The forward end of this finder head casting 90 is formed with a bore 91 which slidably receives the tubular rearward extension 92 of the view finder objective mounting 93. The objective combination within mounting 93 may preferably be an erecting combination giving an image which is right side up and correct as for right and left, such a combination being described in my Reissue Patent No. 17,995, entitled "Erecting finder," issued March 10, 1931. As stated above, the tubular rearward extension 92 of the objective mounting is slidable in the bore 91 of the finder head, and such movement is utilized for focusing of the finder. No specific means for accomplishing such focusing movement of the finder objective mounting is here illustrated in detail, although I may prefer to utilize for this purpose such a means as is disclosed in my copending application entitled "Swinging finder mounting", Ser. No. 693,738, filed Oct. 16, 1933. Finder head casting 90 is substantially rectangular in transverse cross section, and embodies upper and lower walls 95 and 96, respectively, and rearwardly diverging inner and outer side walls 97 and 98, respectively. Secured to the rear end of casting 90, as by screws 99, are upper and lower view finder casing walls 100 and 101, respectively, and inner and outer side walls 102 and 103, respectively, which latter diverge rearwardly a distance in continuation of the side walls of casting 90, and are then parallel to each other, as clearly shown. The finder casing walls form with casting 90 a light conduit from the objective combination to the rear open end of the instrument. The casing carries suitable optical elements, as a collector lens 105 having a ground glass surface 106 at the proper distance back of the objective, and a second collector lens 107 back of lens 105.

A coil torsion spring 110 is placed around finder mounting pivot pin 89 between lugs 88, with one end bearing against finder mounting member 87 and the other bearing against finder head casting 90 (see Figs. 3 and 7), said spring being so arranged as to urge the finder body to swing inwardly about pivot 89 toward the camera.

Means are now provided for moving the finder body outwardly, in opposition to this spring, in accordance with operation of the camera lens focusing means, and for this purpose an operative interconnection is provided between the manual focusing shaft and the finder body, this interconnection embodying a series of selective camming elements, each of which corresponds to a camera lens of given focal length.

Mounted on the inner side of the finder body is a cam shaft carrier plate 115 (see Figs. 5, 7 and 8), and at the two ends of this plate are depending mountings 116 for the two ends of a horizontal cam carrying shaft 117, said shaft being fitted non-rotatably in said mountings 116. The several cams, designated at 120, 121, 122 and 123, are then rotatably mounted on this shaft 117, each cam being in the form of a flat plate having a curved outer camming edge, and each having a pair of hubs 125 and 126 rotatably mounted on shaft 117. Hubs 125 at the forward ends of the several cams engage one another end to end, while the forward hub 125 comes against mounting 116, and the hubs 126 at the rearward ends of the cams likewise engage one another end to end, with the rearward hub 126 coming against rearward mounting 116, in the manner clearly shown in Fig. 7, this arrangement confining the cams against movement along shaft 117. It will be observed that the several cam plates 120, 121, 122 and 123 extend outwardly from their hubs at different elevations with reference to the hub axis, so that the cam plates may all be moved to the horizontal extended operative position together, and will lie flat together, one above the other, in that position. In the position shown in the drawings cam plates 121, 122 and 123 are in this extended operative position, while the cam plate 120, which would be lowermost when moved to such an extended position, is shown rotated through 180° to the inoperative position, adjacent the lower side of the finder body. It will be obvious that cams 121, 122 and 123 are likewise movable in succession to a similar inoperative position.

Means are provided for each cam for releasably locking it in operative and in inoperative positions. The hub 125 of each cam is provided with a bore 130 (see Fig. 8) opening to shaft 117 and in said bore is a ball 131 pressed inwardly against the shaft by a spring 132, said spring being confined beneath a screw 133 screwthreaded within bore 130. Shaft 117 is provided with a pair of diametrically opposed notches 135 and 136, with which the spring pressed ball 131 registers when the cam plate is in operative and in inoperative positions, respectively. This locking means thus yieldably holds the cam plate in operative or in inoperative position, while permitting the plate to be easily manipulated from one position to the other.

The outer operative edge of each cam plate is curved in accordance with the focal length of the lens with which that cam is to be used. It will be observed that the cams 120, 121, 122 and 123, are, relative to each other, of progressively decreasing widths and increasing lengths. A movable cam actuating member is provided to operate on the curved cam edges, and it will be apparent that however many of the cam plates are in the operative outwardly extending position (as are cams 121, 122 and 123 in Figs. 5 and 7), the cam actuating member will be enabled to engage the curved cam edge of only the lowermost of those cam plates, since all cam plates above are always of narrower width. Accordingly, to select any cam for use, that cam and all of the cams above it are placed in the operative outwardly extended position, while all cams below it are folded down and under the finder body to the inoperative position, as taken by cam 120 in Figs. 5 and 7.

The cam actuating means embodies a roller 140 which is adapted to be moved longitudinally of the camera and to engage and operate on the curved outer edges of the cam plates. This roller is mounted for rotation on a stud 141 which is screwthreaded into the flat upper end of a carrying arm 142, a flat headed screw 143 threaded into the upper end of stud 141 confining the roller against removal, and the roller resting and having bearing on an annular flange 144 formed on stud 141, all as clearly shown in Fig. 5. Arm 142 is pivotally mounted at its lower end on a pivot pin 146 which is coaxial with the pivot axis of door arms 14 and 15, said pivot pin being mounted at its two ends in the two arms 147 and 148 of a yoke-like arm carrier plate 150. The upper end of plate 150 has a screwthreaded bore 151 which receives a screwed section 70a of the shaft member 70 which forms the forward section of the manual focusing shaft 56. Immediately opposite bore 151 carrier member 150 is formed with a slide plate 154 which is slidable in a longitudinally extending way 155 formed in a guide plate 156 secured against the side of the camera case. Arm 142 has a flat surface 160 which is adapted to engage a flat surface 162 on carrier member 150 when said arm is in the position of Fig. 5, the arm being held in such engagement by the action of the finder mounting spring 110 which urges the finder and cams carried thereby to press arm 142 against carrier 150. The head of the screw 143 that secures cam roller 140 on the upper end of arm 142 is received within a longitudinal way 145 formed in a guide strip 149 secured to door 13, and moves in this way as arm 142 moves with carrier 150 to move roller 140 along the cam plates. When the camera door 13 is swung downwardly on pivots 16 and 17, this strip 149 engages the head of screw 143 and so causes arm 142 to swing downwardly on its pivot 146, which is concentric with the door pivots (see Fig. 6). Thus the camera door, finder, and finder actuator arm all swing down together on a single pivot axis, while the cam actuator arm carrier remains stationary.

From what has now been said it will be evident that the rotatable focusing shaft acts as a lead screw to move carrier 150 forwardly or rearwardly as the shaft is turned in one direction or the other, and that the cam roller 140 on the arm 142 which is carried by member 150 acts on the curved outer edge of the selected finder cam to swing the finder on its pivot 89 in accordance with the characteristic of that cam. For instance, the cam roller 140 is shown in full lines in Fig. 7 in engagement with cam 121, and in this position the finder is substantially parallel to the camera, as for an infinity focus position; while in dot-dash lines in the same figure there is shown another position after said roller has been advanced by rotation of the focusing shaft in shortening the focus of the camera lens and has caused the finder body to swing outwardly to view an object relatively close to the camera. It will be understood, of course, that the screw threads between the focusing shaft and the cam roller arm carrier are so arranged that the cam roller moves towards the front end of the camera as the lens is moved forwardly to shorten the distance of focus, and that each cam is designed in accordance with a lens of given focal length, so that by selection of the proper cam for a lens of given focal length in the camera, the finder will automatically be caused to swing, as the focusing shaft is rotated, in such a manner as to maintain the point of intersection of the optical axis of the finder with the optical axis of the camera lens always at the distance at which that camera lens is focused.

It will be understood the drawings and description are to be considered merely as illustrative of and not restrictive on the broader claims appended hereto, for various changes in design, structure and arrangement may be made without departing from the spirit and scope of said claims.

I claim:

1. In a camera adapted to support a photographic lens in a manner to move along its axis, a view finder having a vertical pivot mounting on the camera to one side of the axis of the camera lens, and lens focusing means for moving the lens along its axis: the combination of means for swinging the finder about its vertical pivot axis for parallax adjustment in accordance with operation of the lens focusing means, including a series of selective cams mounted on the finder and adapted to be moved to position to be operated by the lens focusing means, each cam designed to correspond with a camera lens of given focal length.

2. In a camera adapted to support a photographic lens in a manner to move along its axis, a view finder having a vertical pivot mounting on the camera to one side of the axis of the camera lens, and lens focusing means for moving the lens along its axis: the combination of means for swinging the finder about its vertical pivot axis for parallax adjustment in accordance with operation of the lens focusing means, including a series of selective cams mounted on the finder and movable to and from operative position, each cam being designed for photographic lens of given focal length, a cam actuating member adapted for operative engagement with any one of the view finder cams selected and moved to operative position, and means for moving said cam actuating member in acordance with operation of the camera lens focusing means.

3. In a camera adapted to support a photographic lens in a manner to move along its axis, a view finder having a vertical pivot mounting on the camera to one side of the axis of the camera lens, and lens focusing means for moving the lens along its axis: the combination of means for swinging the finder about its vertical pivot axis for parallax adjustment in accordance with operation of the lens focusing means, including a series of selective cams mounted on the finder and movable to and from operative position, each cam being designed for a photographic lens of given focal length, a cam actuating member adapted for operative engagement with any one of the view finder cams selected and moved to operative position, means for moving said cam actuating member in accordance with operation of the camera lens focusing means, and spring means yieldingly urging the finder to swing on its axis in a direction to maintain engagement between the selected operative cam and the cam actuating member.

4. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, said shaft having a screwthreaded section, a cam actuator member screwthreaded on said screwthread shaft section and arranged to be moved longitudinally of the camera by virtue of rotation of said shaft, and a cam on the view finder engaged and operated by said actuator member as the actuator member is moved, said cam being so designed as to cause the view finder to swing for proper parallax adjustment as the lens focusing shaft is rotated.

5. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, said shaft having a screwthreaded section, a cam actuator member screwthreaded on said screwthreaded shaft section and arranged to be moved longitudinally of the camera by virtue of rotation of said shaft, a cam on the view finder engaged and operated by said actuator member as the actuator member is moved, said cam being so designed as to cause the view finder to swing for proper parallax adjustment as the lens focusing shaft is rotated, and spring means urging the view finder to swing to maintain said cam in engagement with said actuating member.

6. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, a cam on the view finder, and actuating means for said cam operated by rotation of said focusing shaft, said cam being so designed as to cause the view finder to swing for proper parallax adjustment as the lens focusing shaft is rotated.

7. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, a cam on the view finder, actuating means for said cam operated by rotation of said focusing shaft, said cam being so designed as to cause the view finder to swing for proper parallax adjustment as the lens focusing shaft is rotated, and spring means urging the view finder to swing to maintain said cam in operative engagement with said actuating means.

8. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, a cam having a pivot mounting on the view finder and adapted to be moved on said pivot between an operative position and an inoperative position, and actuating means for said cam engageable with the cam when the latter is in operative position, said operating means being adapted to be operated by rotation of the focusing shaft, and the cam being so designed as to cause the view finder to swing for proper parallax adjustment as the lens focusing shaft is rotated.

9. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, a plurality of cams pivotally mounted on a common pivot axis on the view finder and adapted to be moved on said axis between operative and inoperative positions, and actuating means engageable with a cam in operative position, said actuating means being adapted to be operated by rotation of the focusing shaft, and the cams being individually designed in accordance with camera lenses of varying focal lengths so as to cause the view finder to swing for proper parallax adjustments for varying operation of the focusing shaft required for lenses of different focal lengths.

10. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, a plurality of cam plates horizontally pivoted on the view finder and arranged in overlapping relation, said cam plates being adapted to take an operative extended position, or to be successively pivotally swung to inoperative positions, and actuating means engageable with a cam in operative position, said actuating means being adapted to be operated by rotation of the focusing shaft, and the cams being individually designed in accordance with camera lenses of varying focal lengths so as to cause the view finder to swing for proper parallax adjustments for varying operation of the focusing shaft required for lenses of different focal lengths.

11. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, a plurality of cam plates horizontally pivoted on the view finder and arranged in overlapping relation, said cam plates being adapted to be moved together to an extended operative position, the cam plates being of successively increasing widths in accordance with the focal lengths of different photographic lenses to be used in the camera, and being adapted to be successively pivotally swung from said operative position to an inoperative position, in order from the widest to the narrowest cam plate, and cam actuating means engageable with the widest cam plate standing at any given time in the extended operative positon, said actuating means being adapted to be operated by rotation of the focusing shaft.

12. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, a plurality of cam plates horizontally pivoted on the view finder on a common pivot axis and arranged to be folded together in overlapping relation in an operative extended position, the cam plates being of successively increasing widths in accordance with the focal lengths of different photographic lenses to be used in the camera, and being adapted to be successively pivotally swung from said operative position to an inoperative position, in order from the widest to the narrowest cam plate, and cam actuating means engageable with the widest cam plate standing at any given time in the extended position, said actuating means being adapted to be operated by rotation of the focusing shaft.

13. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, a substantially longitudinally extending pivot pin mounted on the view finder, a plurality of overlapping cam plates having hubs rotatably mounted on said pivot pin, said cam plates being so arranged on their respective hubs with relation to the hub axis that the cam plates are adapted to fold flat together, means for setting the cam plates in operative extended position, said cam plates being of successively increasing widths in accordance with the focal lengths of different photographic lenses to be used in the camera, and being adapted to be successively pivotally swung from said operative extended position to an inoperative position, in order from the widest to the narrowest cam plate, and cam actuating means engageable with the widest cam plate standing at any given time in the extended operative position, said actuating means being adapted to be operated by rotation of the focusing shaft.

14. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, a substantially longitudinally extending pivot pin mounted on the view finder, a plurality of overlapping cam plates each having two separated hubs rotatably mounted on said pivot pin, the hubs of the several plates being adjacent one another on the pivot pin, said cam plates being so arranged on their respective hubs with relation to the hub axis that the cam plates are adapted to fold flat together, means for setting the cam plates in operative extended position, said cam plates being of successively increasing widths in accordance with the focal lengths of different photographic lenses to be used in the camera, and being adapted to be successively pivotally swung from said operative extended position to an inoperative position, in order from the widest to the narrowest cam plate, and cam actuating means engageable with the widest cam plate standing at any given time in the extended operative position, said actuating means being adapted to be operated by rotation of the focusing shaft.

15. In a camera adapted to support a photographic lens in a manner to move along its axis, and a view finder having a vertical pivot mounting on the camera to one side of the axis of the camera lens: the combination of camera lens focusing means for moving the lens along its axis embodying a rotatable longitudinally extending focusing shaft journaled on the camera, said shaft having a screwthreaded section, a cam actuator member screwthreadedly associated with said screwthreaded shaft section, a slide member on said actuator member and a longitudinal guide way therefor constraining said actuator to longitudinal movement parallel to the focusing shaft as said shaft is rotated, and a cam on the view finder engaged and operated by said actuator member as the actuator member is moved, said cam being so designed as to cause the view finder to swing for proper parallax adjustment as the lens focusing shaft is rotated.

16. In combination with a camera body having a photographic lens movable along its axis, a side door pivotally mounted on the camera so as to swing downwardly on a horizontal door axis, and a view finder having a vertical pivot mounting on the outside of said camera door: camera lens focusing means for moving the lens along its axis embodying a rotatable longitudinally extending focusing shaft journaled on the camera above the door axis, said shaft having a screwthreaded section, a carrier member screwthreadedly associated with said screwthreaded shaft section, a slide member on said carrier member and a longitudinal guide way therefor constraining said carrier to longitudinal movement parallel to the focusing shaft as said shaft is rotated, a cam actuator arm pivoted at its lower end on said carrier member on an axis coincident with the axis of the camera door, guide means on the camera door supporting the upper end of said arm and guiding it to move in a line parallel to the focusing shaft, said cam actuator arm being adapted to swing downwardly with the camera door when the latter is lowered about its pivot axis, and a cam on the view finder engaged and operated by said actuator arm as said arm moves with the carrier when the focusing shaft is rotated, said cam being so designed as to cause the view finder to swing for proper parallax adjustment as the lens focusing shaft is rotated.

17. In combination with a camera, a photographic lens mount barrel removably mounted in the front end of said camera, a second lens mount barrel screwthreaded to said mentioned barrel, a lens carried by the sound barrel, a spur gear on said second barrel, a manually rotatable longitudinally extending focusing shaft journaled on the camera to one side of and parallel to the optical axis of the lens, a gear housing mounted on the camera rotatable on the axis of said focusing shaft, a spiral gear within said housing on the forward end of said shaft, a spiral gear meshing with said gear, a shaft within said housing carrying said gear and extending to a position substantially adjacent said lens barrel gear, a spur gear mounted on said gear housing driven by said last mentioned shaft and adapted to mesh with the spur gear on the lens barrel, and means for setting the housing in a position with the last mentioned gears in mesh, and for releasing the housing to move it on the axis of the focusing shaft to move said gears out of mesh.

GEORGE A. MITCHELL.